United States Patent [19]

Sheehan et al.

[11] Patent Number: 5,300,589
[45] Date of Patent: Apr. 5, 1994

[54] SUBSTITUTED TRIPHENYL COMPOUNDS & PROCESSES FOR PREPARING THE SAME

[75] Inventors: Michael T. Sheehan; James R. Sounik, both of Corpus Christi; William W. Wilkison, III, Richardson, all of Tex.

[73] Assignee: Hoechst Celanese Corporation, Somerville, N.J.

[21] Appl. No.: 69,965

[22] Filed: May 28, 1993

[51] Int. Cl.$^5$ .............................................. C08G 18/30
[52] U.S. Cl. ...................... 525/437; 525/453; 525/461; 528/77; 528/110; 528/297; 528/272; 528/370; 528/372; 568/608
[58] Field of Search ............ 525/437, 453, 461; 528/77, 110, 297, 272, 370, 372; 568/608

[56] References Cited

U.S. PATENT DOCUMENTS 4,394,496  7/1983  Schrader ............................. 528/98

Primary Examiner—Maurice J. Welsh
Attorney, Agent, or Firm—James J. Mullen; Donald R. Cassady

[57] ABSTRACT

Substituted triphenyl compounds endowed with chain extension activity for formulations such as polyurethanes are disclosed, and which have the general formula:

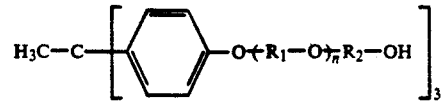

wherein n is 0-1000; $R_1=R_2$, and $R_1$ and $R_2$ are from the group $-CH_2-CH_2$, $-CH_2-C(CH_3)H-$; and $-C(CH_3)H-CH_2-$.

10 Claims, No Drawings

SUBSTITUTED TRIPHENYL COMPOUNDS & PROCESSES FOR PREPARING THE SAME

BACKGROUND OF THE INVENTION

1. Field of the Invention

The present invention relates to novel derivatives of tris(p-hydroxyphenyl)ethane (THPE), to processes for preparing them, to polymer compositions which contain the novel compounds, and to the use of said compositions for a wide variety of end use applications.

2. Description of Related Art

The following prior art references are disclosed in accordance with the terms of 37 CFR 1.56, 1.97, and 1.98.

U.S. Pat. No. 3,579,542, issued May 18, 1971, to Meyer et al. discloses 4,4',4"-trishydroxytriphenylmethymethane endowed with laxative (cathartic) properties.

U.S. Pat. No. 4,113,879, issued Sep. 12, 1978, to Jones et al., discloses pharmaceutical compositions containing 4,4'-dihydroxy-3,3'-triphenylmethanedicarboxylic acids.

U.S. Pat. No. 4,394,496, issued Jul. 19, 1983, to Paul G. Schrader discloses polyglycidyl ethers of tris(hydroxyphenyl) alkanes, their blends with other epoxy compounds, and their cured products.

U.S. Pat. No. 4,695,408, issued Sep. 22, 1987, to Kuo Y. Chang, discloses processes for preparing tris(p-hydroxy-disubstituted phenyl)methanes from 2,6-disubstituted phenols and salicylaldehyde.

U.S. Pat. No. 4,764,580, issued Aug. 16, 1988, to Martin et al., discloses processes for preparing epoxy resins employing 1,1,10-tri(hydroxyphenyl)-alkanes or -alkenes, as the phenolic reactant.

U.S. Pat. No. 4,992,598, issued Feb. 12, 1991, to Strutz, discloses processes for the purification of 1,1,1,tris(4'-hydroxyphenyl)ethane.

U.S. Pat. No. 5,130,467, issued Jul. 14, 1992, to Mott et al., discloses novel compositions of matter, which are mono-, di-, or tri-acrylate esters of 1,1,1-trishydroxyphenylethane and processes for preparing the same.

All of the above-cited prior art patents are incorporated herein by reference in their entirety.

SUMMARY OF THE INVENTION

The present invention provides novel substituted triphenyl compounds ("STC") endowed with chain extension activity for formulations such as polyurethanes and which have the general formula:

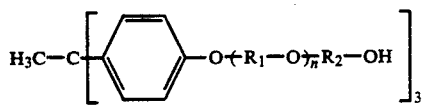

wherein n is 0–1000; and $R_1$ and $R_2$ are from the group —$CH_2$—$CH_2$—; —$CH_2$—$C(CH_3)H$—; and —$C(CH_3)H$—$CH_2$—.

DETAILED DESCRIPTION OF THE PREFERRED EMBODIMENTS

The present invention provides novel substituted triphenyl compounds (STC) which are derivatives of tris(p-hydroxyphenyl)ethane, a well-known basic building block for numerous organic compounds. These novel STC's have the general formula as follows:

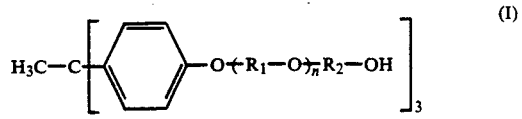

wherein:
n is 0 to 1000 (preferably 0 to 100);
$R_1$ equals $R_2$;
$R_1$ and $R_2$ represent a member from the group:
—$CH_2$—$CH_2$—
—$CH_2$—$C(CH_3)H$—
—$C(CH_3)H$—$CH_2$—

The compounds having the general formula (I) can be prepared by reacting an alkali metal salt of tris(p-hydroxyphenyl)ethane (THPE) with an oxide material such as ethylene oxide or propylene oxide in the presence of a suitable catalyst to form the novel STC having the above formula (I). This overall reaction scheme using ethylene oxide is shown as follows:

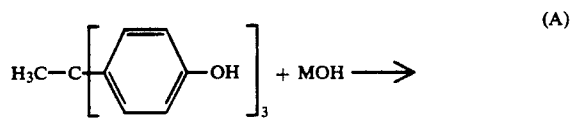

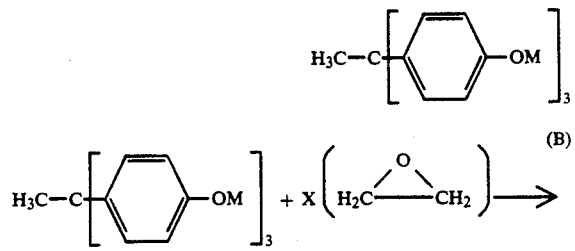

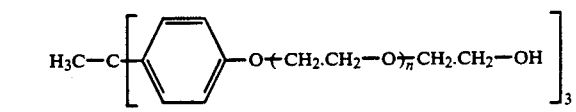

In equation (A), M is an alkali metal such as potassium.

In equation (B), X represents the number of molar equivalents of the ethylene oxide (or propylene oxide) used to form the chain, and n+1 equals X. n can be 0 to 1000, but is preferably from 0 to 100.

In the formulation of the alkali metal salt of THPE, equation (A), the reactants are mixed together in a reaction vessel along with a suitable inert solvent such as isopropanol and then heated at about 30° C. to about 100° C. for a sufficient period of time until all the solids are dissolved into the liquid. The resultant reaction mass is then allowed to cool to room temperature and then the desired alkali metal salt is allowed to crystalize over a period of time suitable to promote crystallization from the solution. The solid material, i.e. the THPE salt, is then separated from the mother liquor by any conventional means, such as filtration. The solid material is then washed with a suitable inert solvent such as heptane and then dried at a temperature of from about 30° C. to about 100° C., under vacuum, where so desired.

In conjunction with equation (B) above, the alkali metal salt of THPE is charged into a reaction vessel along with pre-selected quantities of either ethylene oxide or propylene oxide and a suitable inert solvent such as dimethylformamide (DMF). The reaction vessel is provided with a condenser and a mechanical stirrer. The reaction mass is then slowly heated from room temperature (i.e. 20° C.) to about 100° C. over a period of time to insure that the ethoxylation of propoxylation takes place in the desired fashion. While this part of the process is conducted at atmospheric pressure, it is within the scope of the present invention to conduct this reaction under pressure, e.g. from about 20 psig to about 300 psig, and thus reduce the reaction times. After the reaction has taken place, the reaction mass is allowed to cool to room temperature and then a suitable de-salting agent, such as acetic acid, is added to this mass in order to remove and inactivate the alkali metal ion. This ion complex precipitates and the resultant suspension is separated from the mother liquor by any conventional means such as filtration. This liquid is then reduced under vacuum to form a solid which represents the desired end product, i.e. the ethoxylated or propoxylated THPE.

The STC of this invention are particularly suited for reaction with isocyanates to manufacture articles by a Reaction Injection Molding (RIM) process.

RIM is a technique for the rapid mixture and molding of large, fast-curing urethane parts. RIM polyurethane parts are used in a variety of exterior body applications on automobiles where the light weight contributes to energy conservation. RIM parts are generally made by rapidly mixing active hydrogen-containing materials with polyisocyanate and placing the mixture into a mold where reaction proceeds. After reaction and de-molding, the parts may be subjected to an additional curing step which comprises placing the parts in an oven, held at 250° F. or higher.

Surprisingly, it also has been found that the STC of this invention are useful as curing agents in forming clear epoxy castings and adhesives with highly satisfactory physical properties. Such epoxy products find application in the electrical and electronic fields. These STC's also have been found to be suitable for use in polyesters, polycarbonates, and epoxy resins.

The following specific examples are supplied for the purpose of better illustrating the invention. These examples are not intended, however, to limit or restrict the scope of the invention in any way and should not be construed as providing conditions, parameters, or values which must be utilized exclusively in order to practice the present invention.

EXAMPLE 1

Synthesis of Potassium Salt of Tris(p-Hydroxyphenyl)Ethane (THPE)

A mixture of tris(p-hydroxyphenyl)ethane (THPE) (309 g), potassium hydroxide (120 g), and isopropanol (3 L) is charged to a 5 L glass reactor fitted with a condenser and mechanical stirrer. The mixture is heated until all of the solids are dissolved (85° C.). The solution is then cooled to room temperature and the product is allowed to crystallize for 10 hours. The solid is isolated by filtration, washed with heptane (1 L), and dried under vacuum (60 torr., 50° C.). The product is an off-white solid and weighs 295 g (80%). This reaction is representative of equation (A) above.

EXAMPLE 2

A mixture of potassium salt of Example 1 (151 g), propylene oxide (342), and DMF (900 mL) is charged to a 3 L glass reactor fitted with a condenser and mechanical stirrer. The reaction is heated and the temperature slowly increases from 52° C. to 82° C. over a period of 3 hours. The mixture is cooled to room temperature and acetic acid (73 g) is slowly added. The suspension is filtered and the filtrate is reduced under vacuum to provide a solid. The solid product is a white material and weighs 74 g (81%). Typical physical properties are given in Table I. This reaction is representative of equation (B) above, except that propylene oxide is used instead of ethylene oxide.

TABLE I

| Typical Properties of Propoxylated Tris(p-Hydroxyphenyl)Ethane | |
|---|---|
| Property | Propoxylated Tri(p-Hydroxyphenyl)Ethane |
| Average n | (wt %) |
| n = 0 | 15.6 |
| n = 1 | 60.1 |
| n = 2 | 24.3 |
| n = 3 | — |
| Molecular Weight (Average) | 663.2 |
| Melting Point | 105–121° C. |
| Density (@ 27° C.) | 1.09 g/mL |
| Color | White |
| Solubility (>5 wt %) | |
| Water | No |
| Acetone | Yes |
| Methanol | Yes |
| N,N-Dimethylformamide | Yes |
| Heptane | No |
| Ethyl Acetate | Yes |

EXAMPLES 3–18

Using the procedures set forth in Examples 1 and 2 above, the compounds reported in Table II are obtained.

TABLE II

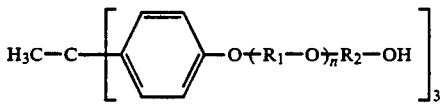

| Example | $R_1/R_2$ | n (Average) |
|---|---|---|
| 3 | —CH$_2$—CH$_2$— | 2 |
| 4 | —CH$_2$—CH$_2$— | 12 |
| 5 | —CH$_2$—CH$_2$— | 72 |
| 6 | —CH$_2$—CH$_2$— | 4 |
| 7 | —CH$_2$—CH$_2$— | 2 |
| 8 | —CH$_2$—CH$_2$— | 3 |
| 9 | —CH$_2$—CH$_2$— | 8 |
| 10 | —CH$_2$—CH$_2$— | 4 |
| 11 | —CH$_2$—C(CH$_3$)H— | 5 |
| 12 | —CH$_2$—C(CH$_3$)H— | 5 |
| 13 | —CH$_2$—C(CH$_3$)H— | 6 |
| 14 | —CH$_2$OC(CH$_3$)H— | 2 |
| 15 | —CH$_2$—C(CH$_3$)H— | 2 |
| 16 | —CH$_2$—C(CH$_3$)H— | 2 |
| 17 | —C(CH$_3$)H—CH$_2$— | 3 |
| 18 | —C(CH$_3$)H—CH$_2$— | 2 |

EXAMPLE 19

Synthesis of a Polyurethane with STC

A 2.0 g sample (0.012 mole) of tolylenediisocyanate (a 80:20 mixture of 2,4 and 2,6 tolylenediisocyanate) is mixed carefully with a 8.7 g sample (0.011 mole) of the STC prepared according to the procedure in Example 2 above. The mixture thickens and hardens to a glassy resin with the generation of heat. The material is a hard, clear, amber solid and is found to be suitable for use in automobile parts.

EXAMPLES 20-36

Preparation of Polyurethanes Containing STC

Polyurethanes are prepared incorporating STC by substitution of STC for other polyols present in a reaction mixture. Examples are described in the Encyclopedia of Polymer Science & Engineering, Volume 1, pgs. 243-303 (2nd Edition, 1988, Wiley). As used herein, the term, "polyurethane" refers to materials that include the carbamate function as well as other functional groups such as ester, ether, amide, and urea. Polyurethanes are usually produced by the reaction of a polyfunctional isocyanate with a polyol or other hydroxyl-containing reactant. Since the functionality of the hydroxy-containing reactant or the isocyanate can be adjusted, a wide variety of branched or cross-linked polymers can be formed. The hydroxyl-containing component may be of a wide variety of branched or cross-linked polymers can be formed. The hydroxyl-containing component may be of a wide variety of molecular weights and types including polyester and polyester polyols. The polyfunctional isocyanates may be aromatic, aliphatic, cycloaliphatic, or polycyclic in structure and can be used directly as produced or modified. The flexibility in reactants leads to the wide range of physical properties of available materials. Present invention polymers are prepared by substituting STC for a portion of the hydroxyl-containing reactant in a mole ratio of STC/hydroxyl from about 0.001:1 to about 1:1 for the polyol in a polyurethane reaction mixture or, in other words, from about 0.05 to about 50 mole percent of the total mixture as described above in connection with Example 19. Specifically, Example 19 is repeated using the STC compounds from Examples 3-18. The resultant polyurethane compositions are found functional in a wide variety of automobile parts.

What is claimed is:

1. Substituted triphenyl compounds having the structural formula (I):

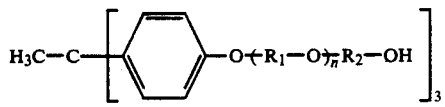

wherein n is 0–1000; $R_1=R_2$, and $R_1$ and $R_2$ are from the group consisting of —$CH_2$—$CH_2$—; —$CH_2$—$C(CH_3)H$—; and —$C(CH_3)H$—$CH_2$—.

2. Substituted triphenyl compounds having the structural formula (II):

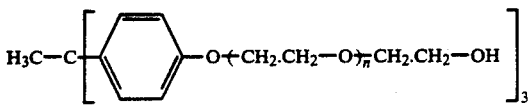

wherein n is 0–1000.

3. Substituted triphenyl compounds having the structural formula (III):

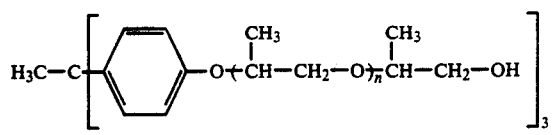

wherein n is 0–1000.

4. Substituted triphenyl compounds having the structural formula (IV):

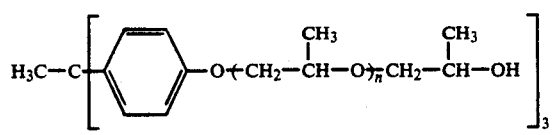

wherein n is 0–1000.

5. A process for preparing substituted triphenyl compounds having the structural formula (I):

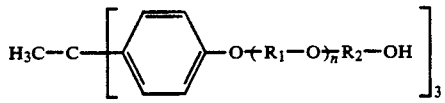

wherein n is 0–1000; $R_1$ equals $R_2$, and $R_1$ and $R_2$ are from the group —$CH_2$—$CH_2$—; —$CH_2$—$C(CH_3)H$—; and —$C(CH_3)H$—$CH_2$—; which comprises the steps of (a) reacting an alkali metal hydroxide with tris(p-hydroxyphenyl)ethane to form the alkali metal salt of said tris(p-hydroxyphenyl)ethane, (b) reacting the alkali metal salt of tris(p-hydroxyphenyl)ethane with an oxide material selected from the group consisting of ethylene oxide and propylene oxide to form substituted triphenyl compounds covered by the structural formula (I) set forth above.

6. The compounds according to claim 1, the residue of which is incorporated into a polyurethane polymer.

7. A polyurethane composition containing at least one substituted triphenyl compound having the structural formula:

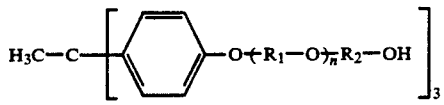

wherein n is 0–1000; $R_1=R_2$, and $R_1$ and $R_2$ are from the group —$CH_2$—$CH_2$—; —$CH_2$—$C(CH_3)H$—; and —$C(CH_3)H$—$CH_2$—.

8. The compounds according to claim 1, the residue of which is incorporated into an epoxy resin.

9. The compounds according to claim 1, the residue of which is incorporated into a polyester.

10. The compounds according to claim 1, the residue of which is incorporated into a polycarbonate.

* * * * *